M. S. EBY.
TRACTOR WHEEL.
APPLICATION FILED NOV. 30, 1915.

1,182,662.

Patented May 9, 1916.

WITNESSES:
J. F. Phillips
C. E. Trauer

INVENTOR
MAURICE S. EBY,
BY Munn & Co.

ATTORNEYS

UNITED STATES PATENT OFFICE.

MAURICE SAMUEL EBY, OF SORRENTO, LOUISIANA.

TRACTOR-WHEEL.

1,182,662.  Specification of Letters Patent.  Patented May 9, 1916.

Application filed November 30, 1915. Serial No. 64,313.

*To all whom it may concern:*

Be it known that I, MAURICE S. EBY, a citizen of the United States, and a resident of Sorrento, in the parish of Ascension and State of Louisiana, have invented certain new and useful Improvements in Tractor-Wheels, of which the following is a specification.

My invention is an improvement in tractor wheels, and the invention has for its object to provide a wheel adapted for use with traction engines, mowing and reaping machines, and vehicles of like character, which operate on plowed ground, woods or other soft land where a maximum pull with a minimum weight is desired, and which applies power to or derives power from the point of engagement with the ground.

Figure 1:
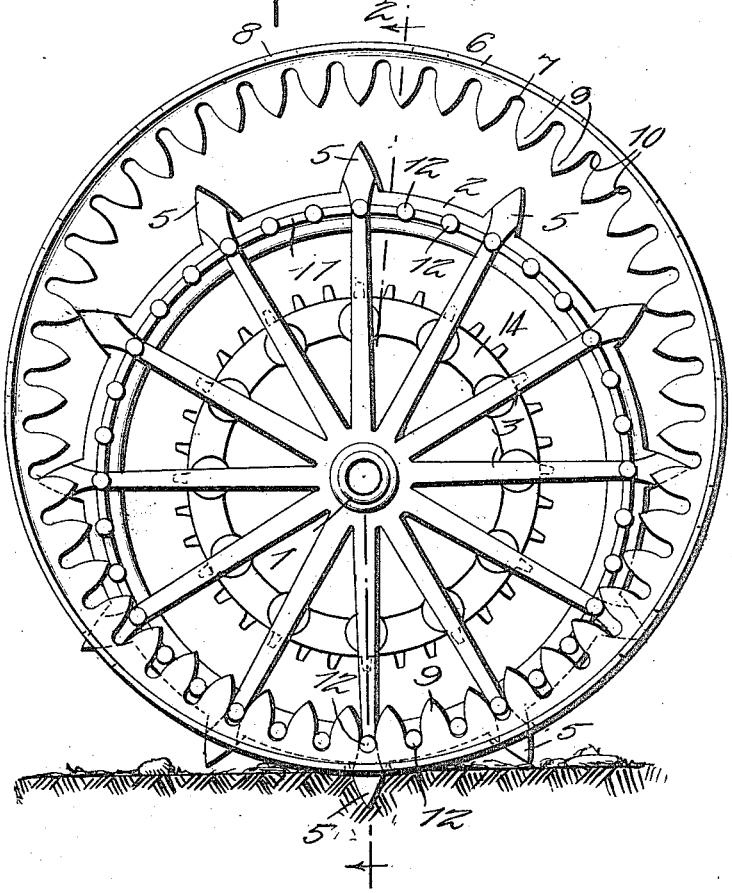
Figure 2:
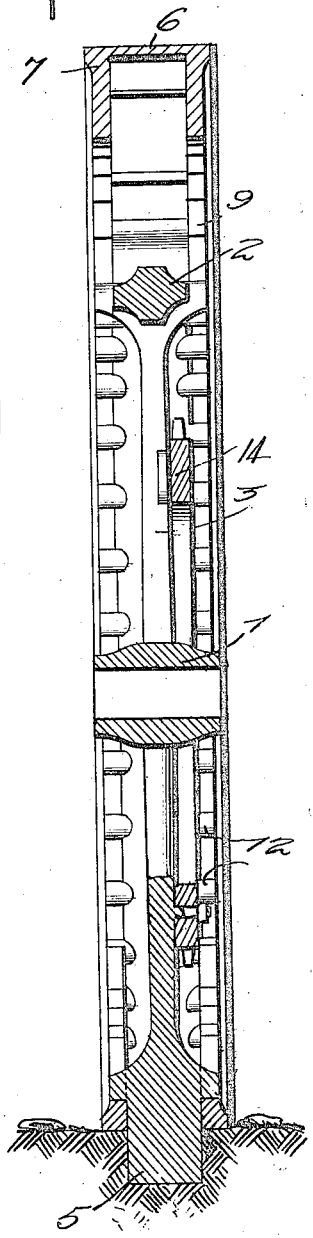

In the drawings: Figure 1 is a side view of the improved wheel, and Fig. 2 is an enlarged section on the line 2—2 of Fig. 1.

In the present embodiment of the invention, an inner wheel is provided, said wheel having in the present instance a hub 1, and a rim 2 connected to the hub by spokes 3. The rim 2 of the wheel is provided with a series of radially extending teeth or lugs 5, the said teeth or lugs being spaced apart from each other, as shown. The inner wheel is arranged within an outer rim of U or channel-shape, and comprising a body 6 having at each side edge an inwardly extending flange 7.

The body 6 is provided with radial openings 8 which are spaced apart to correspond with the spacing of the spurs or lugs 5 on the inner wheel, and the said openings are arranged to permit the passage of the spurs to engage the ground during the use of the wheel.

Each of the flanges or side walls 7 of the outer rim is provided with a series of inwardly extending teeth 9, and the teeth are separated from each other by notches or recesses 10, the said notches or recesses being rounded at their bottoms.

The rim 2 of the inner wheel is provided with a series of laterally extending pins 12, and each series of pins registers with the recesses between the adjacent series of teeth. The spurs or lugs 5 are beveled in opposite directions as shown, to facilitate their passage through the opening of the outer rim, and when in use, the parts will take the position of Fig. 1, the spurs or lugs engaging the ground over which the wheel moves, to prevent slipping, skidding and the like, and to insure a firm grip of the wheel on the road.

The pins 12 by their engagement with the notches or recesses 10 insure the proper alinement of the spurs with the openings, and also prevent angular movement of the wheel with respect to the rim.

The teeth 9 are of greater height than the spurs 5, so that should the spurs strike a rock or other impenetrable substance that will prevent the extrusion of the spur at the lowest portion of the wheel, the pins 12 at this point cannot become disengaged from the teeth.

The inner wheel supports the load, and the spurs 5 are arranged at intervals such that there will always be two or more spurs in engagement with the ground. The object of the outer detached rim is to provide a broad bearing surface which will not sink readily in the soft ground and to which a scraper may be applied on its upper surface, thus obtaining the full effect of the spurs on the inner wheel as they protrude through the openings in the outer rim on its lower surface. It will be obvious that this effect cannot be accomplished with a wheel having cleats or spurs on its outer surface, since the said cleats or spurs would prevent the use of a scraper.

It will be understood that there may be several spurs in a row transversely of the wheel rim, provided only that they are spaced at equal distance around the inner wheel and the suitable openings in the outer rim will have the same spacing.

There may be several rows of spurs on the inner wheel, provided that suitable rows of openings are provided in the outer rim. In the present wheel, cams, rollers, eccentrics, springs, hinge joints, bolts, nuts, and all objectionable mechanical contrivances are entirely eliminated.

While the spurs 5 are shown in alinement with the spokes, it is obvious that this is not necessarily true since they have no connection with the spokes. It will be noticed that in the present instance the spokes are enlarged intermediate their ends, and that a sprocket wheel 14 is connected to the spokes.

I claim:

1. In combination, an outer rim provided with inwardly extending spaced flanges and formed at regular intervals with openings, said flanges being notched to form radially disposed teeth having their front and rear faces similarly inclined, a wheel eccentrically arranged within the outer rim, and formed with a rim adapted to fit snugly between the toothed flanges of the outer rim, and having laterally extending projections to engage the toothed flanges of the outer rim, and formed with tractor lugs to project through the lower-most openings of the outer rim and to clear the upper portion of the tread face of said outer rim.

2. In combination, an outer rim provided with inwardly extending spaced flanges and formed at regular intervals with openings, said flanges being notched to form radially disposed teeth having their front and rear faces similarly inclined, a wheel eccentrically arranged within the outer rim and formed with a rim adapted to fit snugly between the toothed flanges of the outer rim, and having outer tractor lugs to pass between the toothed flanges and through the openings of the outer rim, and formed with laterally extending pins in coincident transverse alinement to engage the toothed flanges of the outer rim.

3. A tractor wheel, comprising a wheel having on its periphery a series of pointed spurs or lugs extending radially therefrom and spaced apart from each other, a rim of channel shape and comprising a body having inwardly extending side walls at its opposite sides, the body having openings corresponding in spacing to the spacing of the spurs adapted to permit the passage of the spurs, and means in connection with the wheel and the rim for preventing angular movement of the wheel with respect to the rim, said means comprising inwardly extending teeth on the side walls of the rim, and a series of extending pins at each side of the wheel and at the rim for engaging between the teeth.

MAURICE SAMUEL EBY.

Witnesses:
JOHN WILLIAM OPDENWEYER,
FRANK M. OPDENWEYER.

Copies of this patent may be obtained for five cents each, by addressing the "Commissioner of Patents Washington, D. C."